United States Patent [19]
Pittet et al.

[11] 3,906,119

[45] Sept. 16, 1975

[54] FLAVORING METHODS AND COMPOSITIONS

[75] Inventors: Alan O. Pittet, Atlantic Highlands; John V. Pascale, Jackson; Denis E. Hruza, Bricktown, all of N.J.

[73] Assignee: International Flavors & Fragrances Inc., New York, N.Y.

[22] Filed: May 23, 1973

[21] Appl. No.: 362,886

Related U.S. Application Data

[62] Division of Ser. No. 201,545, Nov. 23, 1971, abandoned.

[52] U.S. Cl. .............. 426/535; 131/144; 252/522; 424/65; 260/456 R
[51] Int. Cl.² ........................................ A23L 1/226
[58] Field of Search ............ 426/65, 175, 221, 222; 131/17, 144; 424/65; 260/456 R

[56] References Cited
FOREIGN PATENTS OR APPLICATIONS
6,812,899    3/1969    Netherlands

OTHER PUBLICATIONS

P. Carre et al., Compt. rend. 200, (1935), 2086–2089.

Beilsteins Handbook of organic Chemistry, Vol. 4, 3rd Supp., 1962, pp. 5, 6.

*Primary Examiner*—A. Louis Monacell
*Assistant Examiner*—Esther L. Massung
*Attorney, Agent, or Firm*—Brooks Haidt Haffner & Delahunty

[57]             ABSTRACT

Imparting fresh vegetable and/or alliaceous flavors and fruity and/or floral aromas to foodstuffs by adding an effective amount of at least one sulfinate selected from the group consisting of allyl propane sulfinate, benzyl propane sulfinate, and cyclopentyl propane sulfinate.

4 Claims, No Drawings

FLAVORING METHODS AND COMPOSITIONS

This is a divisional application of Ser. No. 201,545 filed Nov. 23, 1971, now abandoned.

BACKGROUND OF THE INVENTION

The present invention relates to novel methods and compositions utilizing certain sulfinates to alter the flavor and/or aroma of consumable materials.

There has been considerable work on substances which can be used to impart flavors or fragrances to various consumable materials. These substances are used to diminish dependence on natural materials, some of which may be in short supply, and to provide more uniform properties in the finished product. Vegetable flavors, and particularly alliaceous vegetable flavors, are particularly desirable for many uses in consumable articles.

Wahlroos, *Acta Chem. Scand.* 19, 1327, and other authors have suggested the presence of methyl, propyl and propene thiosulfinates in onions and garlic. Ethyl methanesulfinate is said to have a sulfurous, rotten odor-flavor contribution in Netherlands patent application No. 68/12899.

Beilstein shows the preparation of the butyl ester of butanesulfinic acid in Volume 4, 3rd Supplement, at Page 5 and states it is a liquid of characteristic odor, reminiscent of garlic. At Page 6 of the same work the ethyl ester of 3-methylbutanesulfinic acid is said to be an isoamylacetate-like smelling liquid. In addition to the sulfinates noted in Beilskin, J. B. Douglass shows the preparation of a variety of alkyl alkanesulfinates utilizing alkyl and alkane groups having from one to four carbon atoms in *J. Organic Chem.* 30, 633 (1965).

U.S. Pat. No. 3,501,514 shows certain sulfinates and methods for their preparation. Field et al. show aryl and alkaryl methanesulfinates in *J.A.C.S.* 84, 847 (1962) and Field et al. also show alkyl alkanesulfinates in *J.A.C.S.* 83 1256. Axelrad shows lower alkyl methanesulfinates in an unpublished thesis, *Dissertation Abstr.* B 27(8) 2643 (1967) (*Chem. Abstr.* 67, 53484 a), and alkyl aromatic sulfinates are shown by Kobayashi et al., *Bull. Chem. Soc. Japan* 39, 2736; Locke, *Dissertation Abstract* 22, 2199 (1962); and Wragg et al., *J. Chem. Soc.* 1958, 3603.

THE INVENTION

It has now been discovered that certain alkyl, alkenyl, cycloalkyl, aryl, alkaryl and aralkyl esters of alkanesulfinic acids can be used to impart good vegetable flavor character to foodstuffs, and they can also be used to provide floral fragrance notes in perfumed compositions and articles and in tobacco products. More specifically, sulfinates having the formula:

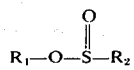

wherein $R_1$ is alkyl, cycloalkyl, aryl, alkaryl, aralkyl, or alkenyl, $R_2$ is alkyl, and $R_1$ and $R_2$ together contain at least four carbon atoms, are used according to this invention in small amounts effective to alter the flavor and/or aroma of consumable materials. It is further contemplated according to the present invention that compositions containing effective amounts of such sulfinates also be used for altering flavors and aromas. Novel compounds and the processes for making them are also disclosed.

As used herein, consumable material includes foodstuffs, tobacco and tobacco-like products, perfume and perfume compositions, and materials such as soaps, detergents, space odorants and deodorants, and the like in which the aroma and/or flavor is altered. It will thus be understood that compounds according to this invention can be utilized to alter the flavor and/or aroma of a wide variety of materials which are ingested by humans or animals or otherwise consumed or used.

In the present invention, the groups represented by $R_1$ desirably contain from one to about ten carbon atoms and can be straight-chain or branched-chain, cycloalkyl containing five to ten carbon atoms or aryl, alkaryl and aralkyl. The aryl can be mono- or polynuclear, and the alkyl groups are preferably lower alkyl containing up to five carbon atoms. Thus, preferred groups represented by $R_1$ according to the present invention include methyl, ethyl, propyl, isopropyl, butyl, amyl, isoamyl, hexyl, decyl, allyl, cyclopentyl, cyclohexyl, phenyl, tolyl, benzyl, phenylethyl, and the like.

The alkyl groups represented by $R_2$ contain from one to ten carbon atoms, and they desirably contain from one to six carbon atoms. Thus, preferred alkyl groups include methyl, ethyl, propyl, isopropyl, amyl, isoamyl, hexyl, and the like.

The sulfinates used according to the present invention are, in some instances, known compounds, although certain materials used herein are novel and are so indicated below. Regardless of the source of the sulfinate or sulfinates, these substances should be free from any deleterious impurities which affect their suitability for use in flavors and fragrances. In many instances, it is desirable to have the sulfinates to be at least 95% pure.

The nomenclature herein used will describe the sulfinates as alkyl, cycloalkyl, alkenyl, aryl, aralkyl and alkaryl alkanesulfinates. It will be understood according to this nomenclature that the alkane group is substituent on the sulfinic sulfur atom and the alkyl, cycloalkyl, aryl, alkaryl, aralkyl or alkenyl is substituent on the oxygen atom singly bonded to the sulfur atom.

In the formula given above, the $R_1$ substituent is called "alkyl" and the $R_2$ substituent "alkane". Thus, for example, propyl methanesulfinate has the formula

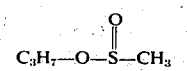

The preferred novel sulfinates according to this invention are defined by the foregoing structure wherein $R_1$ is methyl and $R_2$ is propyl or hexyl or wherein $R_2$ is alkyl having one or three carbon atoms and $R_1$ is allyl, benzyl, hexyl, cyclopentyl, or decyl.

Propyl methanesulfinate has a green onion, cabbage odor with a note of surface-ripened cheese. It is suitable for use in providing cheese, garlic, onion, cabbage, and cooked tomato flavors in foodstuffs and for use in flavoring compositions for such purposes. Its threshold level in aqueous solution is about 1 part per million (ppm). It can be used at levels in the area of 10 ppm in foodstuffs. Its odor is described as green, ethereal, water-cress, cooked cabbage, and sauerkraut. All parts, proportions, percentages, and ratios herein are by weight unless otherwise indicated.

Methyl propanesulfinate is a novel compound having a cooked onion odor with fruity and light sweet aroma backnotes and the formula:

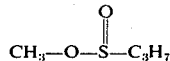

When tasted in aqueous solution at 10 ppm, it has a sweet onion juice character with a burning sensation. In salt water at 10 ppm, a sweet vegetable taste is enhanced and at the same level in aqueous sucrose solution a ripe berry character is noted. The threshold level is about 1 ppm and use levels generally are 10 ppm and higher. It is useful in onion soup and gravy flavors and for ripe flavor notes in berry flavors such as red currant, raspberry, and gooseberry.

Propyl propanesulfinate has the odor of sweet fresh onion juice and the formula:

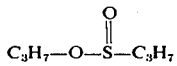

When tasted in aqueous solution at 10 ppm, it has a strong onion flavor with a parboiled onion aftertaste. It also has a salami-garlic flavor note suiting it for use in spice and meat flavors, as well as for onion flavors, soups, and gravies. Its threshold level is about one ppm and the use levels for onion flavor in foodstuffs are about five to ten ppm.

Allyl propanesulfinate is a novel compound having a sour pickled onion odor drying out to a garlic character and the formula:

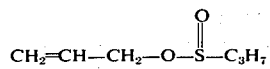

At 2 to 10 ppm in aqueous solution, it has a characteristic raw chopped cabbage flavor. At 10 ppm it also has a taste of fresh onion juice. It is suitable for use in onion, vegetable, especially cabbage, and meat flavors. At 1 ppm it has a weak onion fruity aroma and taste with a metallic note. It is also useful for cole slaw flavors. In tobacco products, e.g., cigarette wrappers and cigar filters, it contributes a good Havana cigar flavor.

Methyl hexanesulfinate is a novel compound having an aroma and taste at 0.5–2.0 ppm in aqueous solution as found in fresh cabbage, cole slaw, and sauerkraut and the formula:

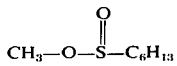

These flavor notes are enhanced by salt and depressed by sugar. It is suitable for vegetable flavors, especially cole slaw and sauerkraut. It also has a sweet fruity character which would suit it for use in canned fruit juices such as orange and pineapple. For perfume formulations its rhubarb, bulb-like, floral qualities make it useful. In tobacco products, e.g., cigarette wrappers and filters, it contributes an interesting green grassy note with good burn characteristics.

Hexyl methanesulfinate is a novel compound having weak fruity and piperonal fragrance and the formula:

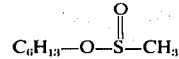

Its threshold level in aqueous solution is about ten ppm, and its use level is about 50 to 100 ppm. It is suitable for fruit flavors including ripe fruits and berries, tropical fruits and pineapple and apple.

Benzyl propanesulfinate is a novel compound having a characteristic cooked cabbage sauerkraut odor and the formula:

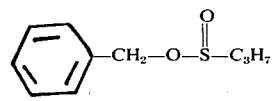

When tasted at 0.2 ppm it has an onion-beef broth flavor which makes it suitable for meat, gravy, onion and soup flavors. Its threshold in water is about 0.05 ppm.

Decyl methanesulfinate is a novel compound having a fresh fruity aroma and the formula:

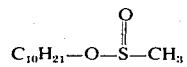

When tasted in water at three ppm, it has a sweet flavor reminiscent of black cherry.

Cyclopentyl propanesulfinate is a novel compound having a sweet onion aroma and the formula

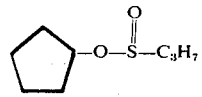

When tasted in water at 0.2 ppm it has a characteristic sweet taste of steamed onions.

It will be appreciated from the present disclosure that the sulfinates of this invention can be used singly or in combination, can be used to alter, vary, fortify, modify, enhance, or otherwise improve the flavor or aroma of a wide variety of materials which are ingested, consumed, or otherwise organoleptically sensed.

The term "alter" in its various forms will be understood herein to mean the supplying or imparting a flavor or aroma character or note to an otherwise bland, relatively tasteless substance, or augmenting an existing characteristic where the natural flavor or aroma is deficient in some regard, or supplementing the existing flavor impression to modify organoleptic character.

The sulfinates and mixtures thereof are accordingly useful in flavoring compositions. A flavoring composition is taken to mean one which contributes a part of the overall flavor impression by supplementing or fortifying a natural or artificial flavor in a material as well as one which supplies substantially all the flavor and/or aroma character to a consumable article.

The term "foodstuff" as used herein includes both solid and liquid ingestible materials for man or animal, which materials usually do, but need not, have nutritional value. Thus, foodstuffs include meats, gravies, soups, convenience foods, malt, alcoholic, and other beverages, milk and dairy products, seafoods including fish, crustaceans, mollusks, and the like, candies, vegetables, cereals, soft drinks, snacks, dog and cat foods, other veterinary products, and the like. It will be understood by those skilled in the art that the alkane sulfinate esters can be used to impart vegetable, alliaceous, fruit and other flavor notes to foodstuffs as aforementioned whenever such notes are desired.

When the sulfinates of this invention are used in a flavoring composition, they can be combined with conventional flavoring materials or adjuvants. Such coingredients or flavoring adjuvants are well known in the art for such use and have been extensively described in the literature. Apart from the requirement that any such adjuvant material be ingestibly acceptable, and thus non-toxic or otherwise non-deleterious conventional materials can be used and broadly include other flavor materials, vehicles, stabilizers, thickeners, surface active agents, conditioners and flavor intensifiers.

Such conventional flavoring materials include saturated, unsaturated, fatty and amino acids; alcohols, including primary and secondary alcohols; esters; carbonyl compounds including ketones and aldehydes; lactones; other cyclic organic materials including benzene derivatives, alicyclics, heterocyclics such as furans, pyridines, pyrazines and the like or derivatives thereof; other sulfur-containing materials including thiols, sulfides, disulfides and the like; proteins; lipids; carbohydrates; so-called flavor potentiators such as monosodium glutamate, guanylates, and inosinates; natural flavoring materials; essential oils and extracts; artificial flavoring materials; and the like. Certain vegetable-type or fruit or alliaceous flavoring compositions according to the present invention desirably contain, in addition to one or more sulfinates as described herein, 2-isobutyl thiazole, 2-methoxy-3-isobutylpyrazine, diallyl disulfide, dipropyl disulfide, propyl propenyl disulfide, or a mixture of two or more such materials.

Stabilizers include preservatives such as sodium chloride, and the like, antioxidants such as calcium and sodium ascorbate, ascorbic acid, butylated hydroxyanisole, butylated hydroxytoluene, propyl gallate, and the like, sequestrants such as citric acid, ethylenediamine tetracetic acid, phosphates, and the like.

Thickeners include materials such as carriers, binders, protective colloids, suspending agents, emulsifiers and the like, such as agar-agar, carrageenan, cellulose and cellulose derivatives such as carboxymethyl cellulose and methyl cellulose, natural and synthetic gums such as gum arabic, gum tragacanth and the like, and other proteinaceous materials, lipids, carbohydrates, starches, and pectins.

Surface active agents include emulsifying agents such as mono- and/or diglycerides of fatty acids such as sorbitan, capric acid, caprylic acid, palmitic acid, stearic acid, oleic acid, myristic acid, linolenic acid, and the like, lecithin, defoaming and flavor-dispersing agents such as monostearate, potassium stearate, hydrogenated tallow alcohol, and the like.

Conditioners include compounds such as bleaching and maturing agents such as benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents such as sodium acetate, ammonium bicarbonate, ammonium phosphate, citric acid, lactic acid, vinegar and the like; colorants such as carminic acid, cochineal, turmeric, curcumin and the like; firming agents such as aluminum sodium sulfate, calcium chloride and calcium gluconate; texturizers; anti-caking agents such as aluminum calcium sulfate and tribasic calcium phosphate; enzymes; yeast foods such as calcium lactate and calcium sulfate; nutrient supplements such as iron salts such as ferric phosphate, ferric pyrophosphate, ferrous gluconate and the like, riboflavin, vitamins, zinc sources such as zinc chloride, zinc sulfate, and the like.

The sulfinates or mixtures thereof or the combinations incorporating them, as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenan, other gums, and the like. The sulfinate can be incorporated with the carriers by conventional means such as spray-drying, drum-drying, and the like. Such carriers can also include materials for coacervating the sulfinates of the present invention (and other flavoring ingredients, as present) to provide encapsulated products. When the carrier is an emulsion, the flavoring composition can also contain emulsifiers such as mono- and diglycerides of fatty acids and the like. With these carriers or vehicles the desired physical form of the composition can be prepared.

It will be understood by those skilled in the art that the sulfinate compounds can be added to the materials to be flavored at any convenient point in the production of the finished product. Thus, when the sulfinate is used to alter or otherwise vary the flavor of a foodstuff, it can be added in the original mixture, dough, emulsion, batter, natural product, or the like prior to any cooking or heating operation. Alternatively, it can be added at a later stage of processing if volatilization losses would be excessive during the earlier processing. The quantity of sulfinate utilized should be sufficient to impart the desired vegetable flavor characteristic to the product, but on the other hand, the use of an excessive amount of such sulfinates is not only wasteful and uneconomic, but too large a quantity unbalances the flavor of the product consumed. Moreover, at too high a level in flavoring compositions (and also in foodstuffs) the vegetable, fruit, of other pleasant food character of the sulfinates will be lost.

The quantity used will vary depending upon the ultimate foodstuff, or other consumable product; the amount and type of flavor initially present in the product; the further process or treatment steps to which the product will be subjected; regional and other preference factors; the type of storage, if any, to which the product will be subjected; and the pre-consumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff, tobacco, or other consumable material.

Sulfinates according to this invention can also be used to improve the organoleptic properties of tobacco and tobacco products. Tobacco, as used herein, includes natural tobaccos such as burley, Turkish tobacco, Maryland tabacco; tobacco-like products such as reconstituted tobacco or homogenized tobacco; and tobacco substitutes intended to replace natural tobacco such as various vegetable leaves, for example lettuce and cabbage leaves and the like. It is also used to include tobacco and tobacco products such as cigarette tobacco, cigars, snuff, chewing tobacco and like materials for ultimate use by a consumer.

When the sulfinates are used to treat tobacco, the additive can be applied in a suitable manner, as by spraying, dipping or otherwise. The sulfinates or compositions containing them can be applied during the "casing" or final spray treatment of the tobacco, or they can be applied at some earlier stage of curing or preparation. The quantity of sulfinates or mixtures thereof utilized should be sufficient to impart the desired flavor characteristic to the product; on the other hand, the use of an excessive amount of the sulfinates is not only wasteful and uneconomic, as noted above, but in some instances too large a quantity may unbalance the flavor or other organoleptic property of the product consumed.

It is accordingly highly desirable that the ultimate compositions contain from about 0.05 ppm to about 150 ppm of the sulfinate or sulfinates. More particularly, in food compositions it is preferred to use from about 0.2 to about 20 ppm.

The amount of sulfinates to be utilized in flavoring compositions can be varied over a wide range depending upon a particular quality to be added to the foodstuff or other consumable material. Thus, amounts of the sulfinate according to the present invention from about 0.1 percent up to 80 or 90 percent can be incorporated in such compositions. It is generally found to be desirable to include from about 0.5 to about 25 percent of sulfinate in such composition.

The sulfinates of this invention are also useful olfactory agents. The floral and fruity aroma notes suit them for formulation into, or for use as a component of, a perfume composition in appropriate amounts.

The term "perfume composition" is used herein to mean a mixture of organic compounds, including, for example alcohols, aldehydes, ketones, nitriles, other esters, and frequently hydrocarbons which are admixed so that the combined odors of the individual components produce a pleasant or desired fragrance. Such perfume compositions usually contain: (a) the main note or the "bouquet" or foundationstone of the composition; (b) modifiers which round-off and accompany the main note; (c) fixatives which include odorous substances which lend a particular note to the perfume throughout all stages of evaporation, and substances which retard evaporation; and (d) top notes which are usually low-boiling fresh smelling materials.

In perfume compositions the individual component will contribute its particular olfactory characteristics, but the overall effect of the perfume composition will be the sum of the effect of each ingredient. Thus, the sulfinates of this invention can be used to alter the aroma characteristics of a perfume composition, for example, by high-lighting or moderating the olfactory reaction contributed by another ingredient in the composition.

The amount of the compounds of this invention which will be effective in perfume compositions depends on many factors, including the other ingredients, their amounts and the effects which are desired. It has been found that perfume compositions containing as little as 0.01 percent of the compounds of this invention, or even less, can be used to impart a floral, hyacinth, or fruit scent note to soaps, cosmetics, and the other products. The amount employed can range up to 0.5 percent or higher and will depend on considerations of cost, nature of the end product, the effect desired on the finished product, and the particular fragrance sought.

The sulfinate or sulfinates of this invention can be used alone or in a perfume composition as an olfactory component in detergents and soaps; space odorants and deodorants; perfumes; colognes; toilet waters; bath preparations such as bath oil and bath salts; hair preparations such as lacquers, brilliantines, pomades, and shampoos; cosmetic preparations such as creams, deodorants, hand lotions, and sun screens; powders such as talcs, dusting powders, face powder, and the like. When used as an olfactory component of a perfumed article, as little as 0.01 percent of sulfinate will suffice to improve the odor. Generally, no more than two percent is required, and it is preferred to use less than 0.2 percent.

In addition, the perfume composition or fragrance composition can contain a vehicle or carrier for the sulfinate alone or with other ingredients. The vehicle can be a liquid such as alcohol, glycol, or the like. The carrier can be an adsorbent solid such as a gum or components for encapsulating the composition.

It will be appreciated that the sulfinates according to this invention can be used to alter, enhance, modify, vary, or supplement the fragrance properties of natural or synthetic fragrance compositions. Thus, such sulfinates can be used in fragrance compositions for addition to perfume compositions or directly to products such as soap, detergents, cosmetics and the like. The fragrance compositions so prepared do not entirely provide the olfactory properties to the finished perfome or other article, but they do furnish a substantial part of the overall fragrance composition.

The sulfinates according to the present invention are readily prepared by reacting a sulfinyl chloride directly with the appropriate alcohol. If the particular sulfinyl chloride is not available, an alkyl, cycloalkyl, alkylene, aryl, alkaryl or aralkyl mercaptan or disulfide is converted to a sulfinyl chloride and the chloride is then reacted directly with the alcohol. After the reaction is complete, the reaction mixture is treated with pyridines to remove any hydrogen chloride and unreacted chlorides.

The sulfinates are accordingly prepared by the method of Douglass in which $R_2$—SO—Cl is reacted with $R_1$—OH, where $R_1$ and $R_2$ have the meanings heretofore given. If not available, the $R_2$—SO—Cl can be prepared from $R_2$—$SSR_2$ or $R_2$—SH by treatment thereof with chlorine in an acidic medium such as a lower carboxylic acid like acetic acid. After reaction of the $R_2$—SO—Cl and $R_1$—OH, the

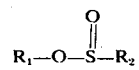

is treated with pyridine and any solid precipitate is removed. The sulfinate is obtained from the filtrate and is purified or isolated by conventional techniques such as distillation, extraction, fractional crystallization, preparative chromatographic techniques, and the like. A preferred method is fractional distillation.

As noted above, the reaction is initially carried out at a temperature sufficient to provide a good velocity, but low enough to provide control thereof. After the reactants have been admixed at −40°C to 0°C, preferably −35° to −15°C to assure reaction completeness. The temperature is then increased to 35°C or higher to expel hydrogen chloride.

The time required for the reaction is dependent upon the temperature, the particular reactants utilized, and like factors. The reaction period can be varied from about 30 minutes to about 8 hours with good results. Times of 2 to 4 hours are preferred.

The reaction can be run at atmospheric, subatmospheric, or superatmospheric pressure. It is generally desirable to carry out the reaction initially under a vacuum to remove hydrogen chloride. The reaction is preferably run under anhydrous conditions, and if desired an inert gas such as nitrogen, argon, or the like can be used to blanket the reaction mixture.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of Methyl Propanesulfinate

A 50 ml three-necked flask equipped with a magnetic stirrer, thermometer, and dropping funnel is charged with 25.3 g (0.20 mole) of propyl sulfinyl chloride, the contents are cooled to −30°C, and 7 g (0.22 mole) of precooled methanol is added during a 15-minute period, during which the flask temperature is maintained below −20°C. The flask is then equipped with a dry-ice condenser and a 20 mm Hg vacuum is applied to the top of the condenser while the pot temperature is allowed to rise to 20°C over a 2-hour period.

The dry-ice condenser is then removed and the temperature is raised to 35°, causing the final expulsion of the dissolved hydrogen chloride. When the reaction mixture ceases to bubble, it is added to an erlenmeyer flask containing 2 g of pyridine dissolved 100 ml diethyl ether. The precipitate which forms is removed and the filtrate is evaporated to yield a residue which is vacuum distilled.

The methyl propanesulfinate is obtained as a colorless liquid with b.p. 61°C at 17 mm Hg. Yield is 13.3 g (55%).

EXAMPLE II

Preparation of Allyl Propanesulfinate

Into a 50 ml three-necked flask equipped with a magnetic stirrer, thermometer and dropping funnel is added 25.3 (0.20 moles) of propyl sulfinyl chloride. 12.76 gms. (0.22 moles) of chilled allyl alcohol is added over a period of 15 minutes while maintaining the reaction mass at a temperature of −20°C. The flask is then equipped with a dry-ice condenser and a 20 mm vacuum is applied to the reaction-condenser apparatus over a period of two hours the pot temperature is raised to +20°C while stirring. The dry-ice condenser is then removed and the reaction mass temperature is raised to 35°C.

Into an Erlenmeyer flask, the following ingredients are added:

| Ingredient | Quantity |
| --- | --- |
| Pyridine | 2 grams |
| Anhydrous diethyl ether | 100 ml |

A precipitate forms in the Erlenmeyer flask immediately on addition of the reaction mass to the pyridine-diethyl ether mixture. The precipitate is then filtered and washed and the residual diethyl ether is removed therefrom on a rotary evaporator. Resulting material is then distilled in vacuo (yield 16 grams; boiling point 88°–89°C at 17 mm Hg pressure) GLC, mass spectral and infrared analysis yield the information that the structure of this material is as follows:

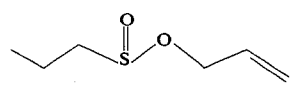

EXAMPLE III

Preparation of Hexyl Methanesulfinate

The procedure of Example I is repeated under a nitrogen blanket in the flask with 11.2 g (0.11 mole) of hexanol, 9.85 g (0.10 mole) of methyl sulfinyl chloride, 1 g of pyridine, and 100 ml of ethyl ether.

Ten grams of hexyl methanesulfinate in 96% purity is obtained as a colorless liquid having a boiling point of 82°–84°C at 11 mm Hg.

EXAMPLE IV

Preparation of Methyl Hexanesulfinate

The procedure of Example I is repeated with 16.85 g (0.10 mole) of hexyl sulfinyl chloride, 3.5 g (0.11 mole) of methanol, 1 g of pyridine, and 100 ml of ethyl ether.

Eleven grams (67% yield) of methyl hexanesulfinate is obtained as a colorless liquid having a boiling point of 97°–98°C at 11 mm Hg.

EXAMPLE V

Preparation of Perfume Composition

A perfume composition is prepared by admixing the following ingredients:

| Ingredient | Amount (parts) |
| --- | --- |
| Amyl cinnamic aldehyde | 300 |
| Phenyl ethyl acetate | 50 |
| Phenyl ethyl alcohol | 30 |
| para-Cresetal | 30 |
| Cyclamal | 20 |
| Anisic alcohol | 25 |
| iso-Cyclocitral | 22 |
| Phenyl ethyl formate | 55 |
| Benzyl salicylate | 50 |
| Geranium bourbon | 20 |
| Ginger oil distilled | 20 |
| Benzophenone | 20 |
| Laurine extra | 15 |
| Phenylacetaldehyde (10% in diethylphthalate) | 10 |
| Phenylacetaldehyde dimethyl acetal | 10 |
| Petinerol | 20 |
| Galbanum | 10 |
| Styrax clarified extra | 10 |
| Clove bud oil, U.S.P. | 20 |
| Cinnamic alcohol | 40 |

-Continued

| Ingredient | Amount (parts) |
| --- | --- |
| Nutmeg oil, terpeneless | 5 |
| 4-Acetyl-1, 1-dimethyl-6-t-butylindane | 40 |
| Vetivert acetate | 10 |
| Methyl hexanesulfinate (10% in 95% ethyl alcohol | 5 |
| Terpineol | 60 |
| Hydroxycitronellal | 20 |
| Narcisse absolute (10% in diethylphthalate) | 18 |

The 10% alcoholic solution of methyl hexanesulfinate imparts a "bulby" note to this formulation, and thereby enhances the hyacinth aroma of the formulation.

EXAMPLE VI

The following ingredients are admixed to provide a perfume composition:

| Ingredient | Amount (parts) |
| --- | --- |
| Cinnamic alcohol | 200 |
| Phenyl acetaldehyde | 45 |
| iso-Eugenol | 1 |
| Benzyl acetate | 200 |
| Linalol | 200 |
| Phenyl ethyl alcohol | 100 |
| Galbanum oil | 10 |
| Narcissus absolute | 20 |
| Heliotropin | 100 |
| Styrax essence | 40 |
| Eugenol | 50 |
| Ionone | 20 |
| Rose otto | 10 |
| Jasmin absolute | 30 |
| Hydroxycitronellal | 200 |
| Methyl hexanesulfinate (10% solution in 95% ethyl alcohol) | 10 |
| Ylang | 10 |
| Jonquille absolute | 5 |
| Ambergris tincture, 3 percent | 30 |
| Musk tincture, 3 percent | 20 |
| Ethyl alcohol | 800 |

The 10% alcoholic solution of methyl hexanesulfinate imparts a bulby note to this formation thereby enhancing the hyacinth aroma of the formulation.

EXAMPLE VII

Tobacco Flavor Mixture Containing Allyl Propanesulfinate

The following mixture is prepared:

| Ingredient | Parts by Weight |
| --- | --- |
| Allyl propanesulfinate | 13.00 |
| Tobacco absolute (note 1) | 553.00 |
| Valerian oil (0.1% in Ethyl Alcohol) | 10.00 |
| Indole | 0.07 |
| Skatole | 0.07 |
| Isovaleric acid | 20.00 |
| Absolute ethyl alcohol | 403.86 |

Note 1: Tobacco absolute prepared by Adrien & Co., 15, Rue de Cassis, Marseilles, France An aged, cured and shredded domestic burley tobacco is spread with the subject mixture in amounts to provide tobacco compositions containing ¼, ½ and ¾% by weight of the foregoing mixture, on a dry basis. Thereafter, the alcohol is removed by evaporation and the tobacco is manufactured into cigars by means of the usual techniques. The tobaccos, treated as indicated, have a desired and pleasing "Havana type" aroma in cigars, which aroma is detectable in the main and side smoke streams when the cigars are smoked.

EXAMPLE VIII

Preparation of Decyl Methanesulfinate

Into a 50 ml three-necked flask equipped with a magnetic stirrer, thermometer, nitrogen purge and dropping funnel is added 9.9 gms (0.10 moles) of methanesulfinyl chloride. The methane sulfinyl chloride is cooled to $-10°C$ and 17.4 gms (0.11 moles) of decanol is added dropwise while maintaining the temperature at $-5°$ down to $-10°C$. When the addition of the decanol is complete, the reaction mass is warmed to 50°C under 20 mm of vacuum. The resulting product is then cooled and dissolved in 100 ml of diethyl ether admixed with 2 gms. of pyridine. The reaction mass is then extracted with two 10 ml portions of water. A drop of pyridine is added to the ether layer in order to remove additional chloride. In the event that no precipitation occurs the ether layer is then extracted with two 10 ml portions of 3% aqueous hydrochloric acid. The ether layer is then dried over anhydrous sodium sulfate and is then evaporated by means of rotary evaporation yielding an oil which is then subjected to a distillation operation. The resulting product is distilled at 98°C at 0.50–0.65 mm Hg pressure. (Yield 16 gms). GLC, mass spectral and infrared analysis yield the information that the structure of this material is as follows:

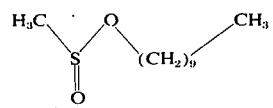

EXAMPLE IX

Preparation of Benzyl Propanesulfinate

The procedure of Example VIII is repeated with 25.3 gms (0.20 moles) of propyl sulfinyl chloride in place of the methane sulfinyl chloride; and 23.8 gms (0.22 moles) of benzyl alcohol in place of the decanol.

The resulting benzyl propanesulfinate is obtained in a yield of 20 gms at a boiling point of 110°–117°C at 1 mm Hg pressure. GLC, mass spectral and infrared analysis yield the information that the structure of this material is as follows:

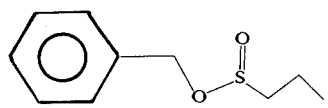

EXAMPLE X

The following mixture is prepared:

| Ingredient | Parts by Weight |
| --- | --- |
| Heliotropine | 5.0 |
| Sage Clary French | 1.0 |
| Vanillin | 5.0 |
| Patchouli Oil, 10% (in 95% ethanol) | 2.0 |
| Butyl isovalerate | 7.0 |
| Amyl isovalerate | 10.0 |
| Methyl isovalerate | 5.0 |
| 2-Hydroxy-3-methyl-2-cyclopenten-1-one | 9.0 |
| Benzaldehyde | 6.0 |

-Continued

| Ingredient | Parts by Weight |
| --- | --- |
| Allyl propanesulfinate (produced according to the process of Example II) | 0.5 |
| Propylene glycol | 150.0 |
| Fenugreek, solid extract (10% in 1:1 propylene glycol/H$_2$O) | 800.0 |

The addition of allyl propanesulfinate to the above formulation in the amount indicated adds a taste of fresh walnut kernels.

EXAMPLE XI

The following mixture is prepared:

| Ingredient | Parts by Weight |
| --- | --- |
| Propyl propanesulfinate | 20 |
| Natural onion oil | 80 |

The mixture is compared with the pure onion oil alone at the rate of 0.1 ppm in water. The propyl propane sulfinate imparts to the onion oil mixture fresh onion notes thus improving the taste characteristics of this oil over natural onion oil.

EXAMPLE XII

Tobacco Flavor Containing Methyl Hexanesulfinate

The following mixture is prepared:

| Ingredient | Parts by Weight |
| --- | --- |
| Methyl hexanesulfinate | 10 |
| Tobacco absolute (Note 1) | 450> |
| Caproic acid | 20 |
| Geraniol | 20 |
| Absolute ethyl alcohol | 500 |

Note 1: Tobacco absolute prepared by Adrien & Co. 15, Rue de Cassis, Marseilles, France The foregoing is spread onto shredded and blended domestic tobacco to produce an 0.005% level of methyl hexanesulfinate by weight on the tobacco. After the ethyl alcohol is evaporated from the treated tobacco, cigarettes are made having a standard cellulose acetate filter. A second quantity of shredded and blended domestic tobacco is spread with the same ingredients with the exception of methyl hexansulfinate. After the ethyl alcohol is evaporated from the tobacco, cigarettes are made having the standard cellulose acetate filter. The second group of cigarettes is used as the control for testing purposes. Both the methyl hexanesulfinate treated cigarettes and the control cigarettes are smoked by experts. The methyl sulfinate cigarettes have an improved burn characteristic, and the aroma on burning includes desirable green grassy notes. The control cigarettes have poorer burn characteristics and on smoking do not yield green grassy notes in the aroma. Thus, the result of the expert test demonstrates a preference for the methyl hexanesulfinate cigarettes over the control cigarettes.

EXAMPLE XIII

Preparation of Cyclopentyl Propanesulfinate

A 50 ml three-necked flask equipped with magnetic stirrer, thermometer, and dropping funnel and blanketed with nitrogen is charged with 25.3 g (0.20 moles) of propyl sulfinyl chloride and cooled to 10°C, whereupon 12.9 g (0.15 mole) of cyclopentanol is added during 20 minutes while the temperature is maintained at from 10° to 20°C. When the addition is complete, mixture is subjected to a vacuum of 30 mm Hg and slowly heated to 50°C to remove the hydrogen chloride formed.

The reaction mixture is then cooled to room temperature and added to a mixture of 150 ml of diethyl ether and 2 g of pyridine. The precipitate which forms is filtered off and the ether-pyridine solution is extracted with 20 ml of 1N hydrochloric acid. The ether solution is then dried, and the ether is recovered on a rotary evaporator.

The remaining oil is distilled to yield 11 g of cyclopentyl propanesulfinate having a boiling point of 70°–75°C at 0.5 mm Hg. Nuclear magnetic resonance spectroscopy indicates that the product is more than 95% pure.

The sulfinate prepared by the foregoing Example, and all of the sulfinates described herein can be used in foodstuffs, perfumes, tobacco, and the like consumable materials.

Those skilled in the art will recognize the utility to which the sulfinates can be put from considering the present disclosure as to their characteristics at various usage levels and the like.

What is claimed is:

1. A process for altering the flavor of a foodstuff which comprises adding thereto an amount of from about 0.05 to 150 parts per million of at least one sulfinate selected from the group consisting of allyl propane sulfinate, benzyl propane sulfinate, and cyclopentyl propane sulfinate.

2. A process as defined in claim 1 wherein said sulfinate is allyl propane sulfinate.

3. A process as defined in claim 1 wherein said sulfinate is benzyl propane sulfinate.

4. A process as defined in claim 1 wherein said sulfinate is cyclopentyl propane sulfinate.

* * * * *